(12) United States Patent
Santerre et al.

(10) Patent No.: US 6,430,706 B1
(45) Date of Patent: Aug. 6, 2002

(54) TRACKING AND MANAGING FAILURE-SUSCEPTIBLE OPERATIONS IN A COMPUTER SYSTEM

(75) Inventors: Pierre-Yves Santerre, Bellevue; Jason Ty Cobb, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 52 days.

(21) Appl. No.: 09/606,870

(22) Filed: Jun. 29, 2000

Related U.S. Application Data

(62) Division of application No. 08/989,147, filed on Dec. 11, 1997, now Pat. No. 6,205,561.

(51) Int. Cl.⁷ .................................................. G06F 11/22
(52) U.S. Cl. ............................... 714/36; 714/57; 714/46; 713/2; 713/100
(58) Field of Search ............................... 714/36, 57, 46; 713/1, 2, 100; 710/10

(56) References Cited

U.S. PATENT DOCUMENTS

| | | | | |
|---|---|---|---|---|
| 3,928,830 A | * | 12/1975 | Bellamy et al. | ............ 235/153 |
| 5,758,155 A | * | 5/1998 | Circenis | ...................... 395/652 |
| 5,918,006 A | * | 6/1999 | Saito et al. | ..................... 714/54 |
| 5,974,546 A | * | 10/1999 | Anderson | ....................... 713/2 |
| 6,058,475 A | * | 5/2000 | McDonald et al. | ............ 713/2 |
| 6,115,544 A | * | 9/2000 | Mueller | ........................ 714/57 |

OTHER PUBLICATIONS

Reinstein et al., "Windows NT Troubleshooting & Configuring", Jul. 1997, Macmillan Computer Publishing, pp. 737–745.*

* cited by examiner

*Primary Examiner*—Scott T Baderman
(74) *Attorney, Agent, or Firm*—Leydig, Voit & Mayer

(57) ABSTRACT

The present invention is directed to tracking and managing failure-susceptible operations in a computer system. In a preferred embodiment, the performance of failure-susceptible operations is monitored such that, when execution of the operating system is interrupted and then restarted, it can be determined which failure-susceptible operation was in progress at the point at which execution of the operating system was interrupted. A list is made of the operations that failed to execute to completion and subsequent invocation of operations on the list is inhibited. A user may review the list and select operations, allowing the selected operations to be subsequently invoked.

7 Claims, 20 Drawing Sheets

| operation identifier | instance data | status |
|---|---|---|
| START_DEVICE | "Creative Labs Sound Blaster 16" | 1 |
| START_DEVICE | "US Robotics Sportster modem" | 0 | operation instance status list — 400, 401, 402

FIG 4 stack 500

| operation identifier | instance data | write to file flag |
|---|---|---|
| POST_ROM | "PCI S3 video card in bus 2 slot 5 function 3" | TRUE |
| START_DEVICE | "PCI S3 video card in bus 2 slot 5 function 3" | TRUE |

| operation identifier | instance data | write to file flag |
|---|---|---|
| CALL_PCI_BIOS | "read at bus 2 slot 5 function 3 offset 21" | TRUE |
| POST_ROM | "PCI S3 video card in bus 2 slot 5 function 3" | TRUE |
| START_DEVICE | "PCI S3 video card in bus 2 slot 5 function 3" | TRUE |

FIG 6

| operation identifier | instance data | status |
|---|---|---|
| START_DEVICE | "Creative Labs Sound Blaster 16" | 1 |
| START_DEVICE | "US Robotics Sportster modem" | 0 |
| CALL_PCI_BIOS | "read at bus 2 slot 5 function 3 offset 21" | 0 | operation instance status list — 800, 801, 802, 803

FIG 8

| operation identifier | instance data | status |
|---|---|---|
| START_DEVICE | "Creative Labs Sound Blaster 16" | 1 |
| START_DEVICE | "US Robotics Sportster modem" | 0 |
| CALL_PCI_BIOS | "read at bus 2 slot 5 function 3 offset 21" | 0 |
| POST_ROM | "PCI S3 video card in bus 2 slot 5 function 3" | 2 |

FIG 10

| operation identifier | text | custom routine |
|---|---|---|
| START_DEVICE | "Starting device" | |
| POST_ROM | "Posting ROM" | |
| CALL_PCI_BIOS | "Calling PCI BIOS" | call pci handler .dll | operation information list — 1300
1301
1302
1303

FIG 13 operation instance status list 1500

| operation identifier | instance data | status | |
|---|---|---|---|
| START_DEVICE | "Creative Labs Sound Blaster 16" | 1 | 1501 |
| START_DEVICE | "US Robotics Sportster modem" | 0 | 1502 |
| CALL_PCI_BIOS | "read at bus 2 slot 5 function 3 offset 21" | 0 | 1503 |
| POST_ROM | "PCI S3 video card in bus 2 slot 5 function 3" | 1 | 1504 |

FIG 15

| operation identifier | instance data | status |
|---|---|---|
| START_DEVICE | "Creative Labs Sound Blaster 16" | 1 |
| START_DEVICE | "US Robotics Sportster modem" | 0 |
| CALL_PCI_BIOS | "read at bus 2 slot 5 function 3 offset 21" | 0 |

FIG 16

| operation identifier | instance data | status |
|---|---|---|
| START_DEVICE | "US Robotics Sportster modem" | 0 |
| CALL_PCI_BIOS | "read at bus 2 slot 5 function 3 offset 21" | 0 |
| POST_ROM | "PCI S3 video card in bus 2 slot 5 function 3" | 1 | operation instance status list — 1900, 1902, 1903, 1904

FIG 19

ND MANAGING FAILURE-
TRACKING AND MANAGING FAILURE-SUSCEPTIBLE OPERATIONS IN A COMPUTER SYSTEM

RELATED APPLICATION

This application is a divisional of application Ser. No. 08/989,147, filed on Dec. 11, 1997, which issued as U.S. Pat. No. 6,205,561 on Mar. 20, 2001.

TECHNICAL FIELD

The invention relates generally to the field of error management in a computer program.

BACKGROUND OF THE INVENTION

The term "booting" refers to a process of loading and executing programs, principally those making up an operating system, in order to prepare a computer system for use by a user. The booting process is said to be made up of a number of operations. As computers become more powerful and capacious and as operating systems continue to evolve, the number of operations invoked during the booting process increases. Additional operations whose invocation succeeds typically add useful functionality to the operating system by, for example, automatically identifying, configuring, and initializing hardware devices installed in the computer system. On the other hand, a significant number of these operations are susceptible to failure when invoked on computer systems having particular hardware or software configurations. When these operations fail during the booting process, they often prevent the booting process from completing, thus making the computer system unusable by the user.

Conventionally, when one of these operations fails during the booting process, a knowledgeable user may be able to diagnose and resolve the problem by identifying, via trial and error, the operation that is failing, then manually modifying the sequence of operations invoked during the booting process tot exclude the identified operation. Where the user is capable of diagnosing and resolving the problem alone, the process is arduous and time-consuming. On the other hand, when the user is incapable of diagnosing and resolving the problem alone, the computer system generally remains unusable until the user can obtain assistance.

Accordingly, an automated system for identifying operations that fail during the booting process and reversibly preventing their invocation during future iterations of the booting process would have significant utility.

SUMMARY OF THE INVENTION

The present invention is directed to tracking and managing operations, such as device initialization operations, that may fail on some computer systems. In accordance with a preferred embodiment of the invention, an operation invocation management software facility ("the facility") prevents the invocation of operations that have been determined to fail on the current computer system. When operations that have neither been determined to fail on the current computer system nor been determined not to fail on the current computer system are attempted, they are placed on a stack of outstanding attempted operations. When such operations complete successfully, the facility removes them from the stack and marks them as having been determined not to fail on the current computer system. When the execution of the operating system concludes, e.g., when the operating system crashes, if one or more operations are still on the stack, these operations have not completed successfully. In such cases, the operation on the top of the stack, i.e., the most recently begun operation, is marked as having been determined to fail on the current computer system.

During each iteration of the booting process, the operation on the top of the stack is marked as having been determined to fail on the current computer system. The stack is then cleared and used to monitor the operations attempted during the current boot process.

The facility preferably includes a user interface for displaying to the user the set of operations that have failed since the last successful boot. This user interface may preferably be disabled for unsophisticated users. Also, in one embodiment, for certain failed operations, special code specific to the operations can be executed to either (1) describe the failure or (2) remediate the failure. A second user interface preferably allows the user to review a log of operation failures noted by the invention.

The facility preferably uses universally unique identifiers (UUIDs), such as globally unique identifiers (GUIDs), to uniquely identify different operations, so that software developers who do not communicate can add new operations to the set of operations without creating an operation identifier conflict. A UUID contains both a time identifier and a machine identifier. The time identifier ensures that two UUIDs produced on the same machine are unique because they are produced at different times. The machine identifier, on the other hand, ensures that two UUIDs produced at the same time are unique because they were produced on different machines. Operation attempts, or "operation instances," are further identified by additional instance data that distinguish separate attempts of the same operation.

The facility thus is able to identify the operations that typically fail on the current computer system and to protect the computer system from possible future failure by preventing the invocation of such operations.

BRIEF DESCRIPTION OF THE DRAWINGS

FIG. 4 is a data structure diagram showing the operation instance status list used by the facility.

FIG. 5 is a data structure diagram showing initial sample contents of the stack reflecting the state of failure-susceptible operations in progress in the computer system.

FIG. 6 is a data structure diagram showing sample contents of the stack after the addition of a new entry.

FIG. 8 is a data structure diagram showing the contents of the operation instance status list after an operation instance has completed successfully.

FIG. 10 is a data structure diagram showing the operation instance status list after the addition of an operation instance contained in a file.

FIG. 13 is a data structure diagram showing an operation information list that contains a textual description of each operation.

FIG. 15 is a data structure diagram showing the change, in the operation instance status list, of the status of operation instances that failed since the last time that the program startup process was successfully completed to "1" indicating that they have failed.

FIG. 16 is a data structure diagram showing the removal from the operation instance status list of operation instances that failed since the last time that the program startup process was successfully completed.

FIG. 19 is a data structure diagram showing the contents of the operation instance status list after an operation instance has been removed by the user.

DETAILED DESCRIPTION OF THE INVENTION

Figure 1:
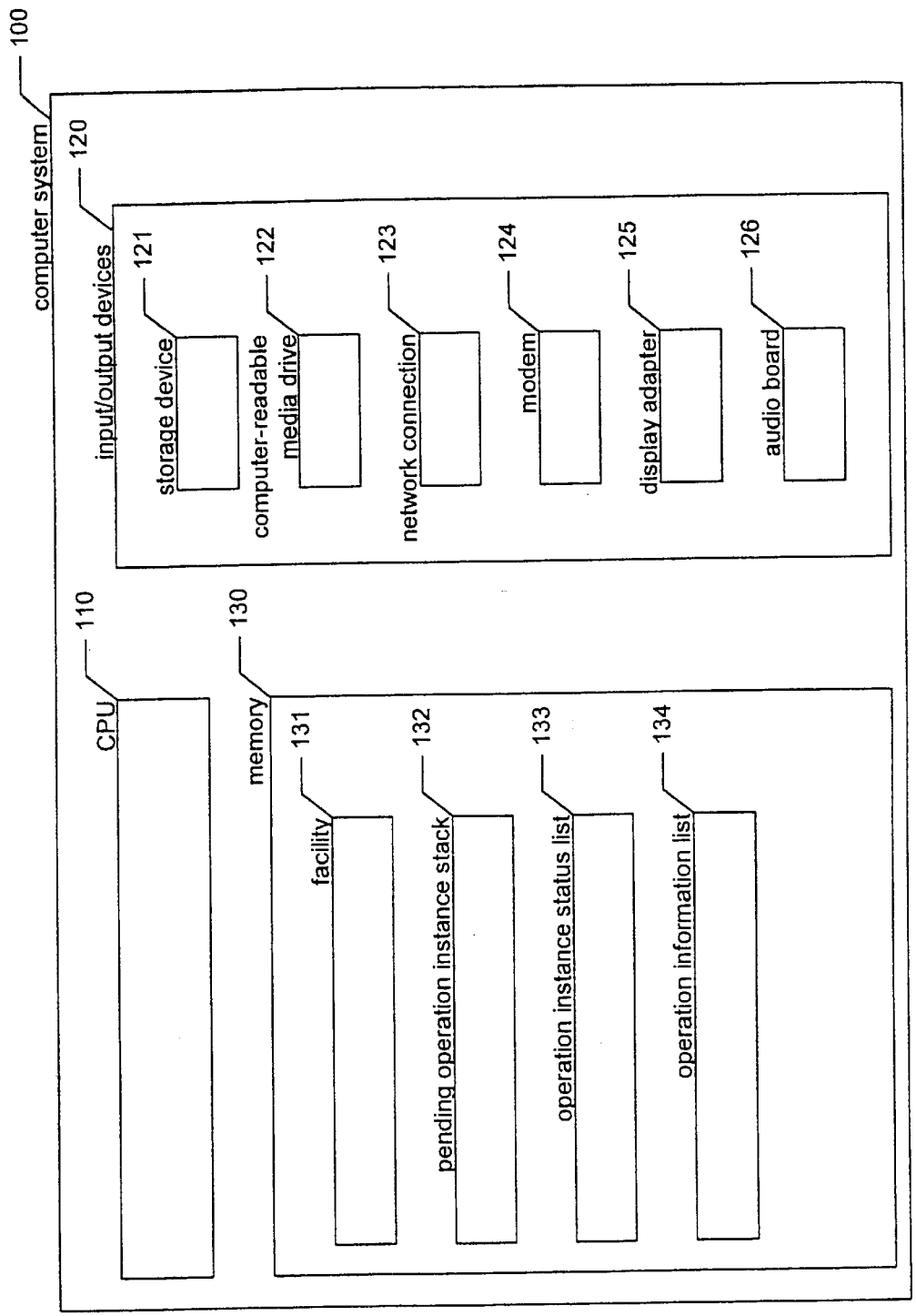
FIG. 1 is a high-level block diagram of the general-purpose computer system upon which the facility preferably executes.

The present invention is directed to tracking and managing operations, such as device initialization operations, that may fail on some computer systems. In accordance with a preferred embodiment of the inventions an operation invocation management software facility ("the facility") prevents the invocation of operations that have been determined to fail on the current computer system. When operations that have neither been determined to fail on the current computer system nor been determined not to fail on the current computer system are attempted, they are placed on a stack of outstanding attempted operations. When such operations complete successfully, the facility removes them from the stack and marks them as having been determined not to fail on the current computer system. When the execution of the operating system concludes, e.g., when the operating system crashes, if one or more operations are still on the stack, these operations have not completed successfully. In such cases, the operation on the top of the stack, i.e., the most recently begun operation, is marked as having been determined to fail on the current computer system.

During each iteration of the booting process, the operation on the top of the stack is marked as having been determined to fail on the current computer system. The stack is then cleared and used to monitor the operations attempted during the current boot process. In certain embodiments of the invention, the facility tracks operation instances rather than merely operations. An operation instance is defined by an operation identifier that identifies a general operation, such as starting a device, coupled with instance data describing details of a particular invocation of the operation, such as the identity of a device to be started using the device starting operation.

The facility preferably includes a user interface for displaying to the user the set of operations that have failed since the last successful boot. This user interface may preferably be disabled for unsophisticated users. Also, in one embodiment, for certain failed operations, special code specific to the operations can be executed to either (1) describe the failure or (2) remediate the failure. A second user interface preferably allows the user to review a log of operation failures noted by the invention.

The facility preferably uses universally unique identifiers (UUIDs), such as globally unique identifiers (GUIDs), to uniquely identify different operations, so that software developers can add new operations to the set of operations without creating an operation identifier conflict. A UUID contains both a time identifier and a machine identifier. The time identifier ensures that two UUIDs produced on the same machine are unique because they are produced at different times. The machine identifier, on the other hand, ensures that two UUIDs produced at the same time are unique because they were produced on different machines. Operation attempts, or "operation instances," are further identified by additional instance data that distinguish separate attempts of the same operation.

The facility thus is able to identify the operations that typically fail on the current computer system and to protect the computer system from possible future failure by preventing the invocation of such operations.

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices is a storage device 121, such as a hard disk drive; a computer-readable media drive 122, which can be used to install software products, including the facility, which are provided on a computer-readable medium, such as a CD-ROM; a network connection 123, through which the computer system 100 may communicate with other connected computer systems (not shown); a modem 124; a display adapter 125; and an audio board 126. The memory 130 preferably contains the facility 131; a stack 132 of the pending operation instances; a status list 133 indicating the status of encountered operation instances; and an operation information list 134 containing information, such as a textual description, for known operations. The storage device 121 may contain a file for persistently storing the contents of the stack, or a portion thereof. While the facility is preferably implemented on a computer system configured as described above, those skilled in the art will recognize that it may also be implemented on computer systems having different configurations.

In order to identify failure-susceptible operations to the facility, programs, such as the operating system, that invoke them call a pair of functions provided by the facility. Programs preferably call this pair of functions to identify the failure-susceptible operations that they perform at any point during their execution. For example, operating systems preferably call the pair of functions when they invoke failure-susceptible operations during the booting process and when they invoke failure-susceptible operations subsequent to the booting process.

Figure 2:
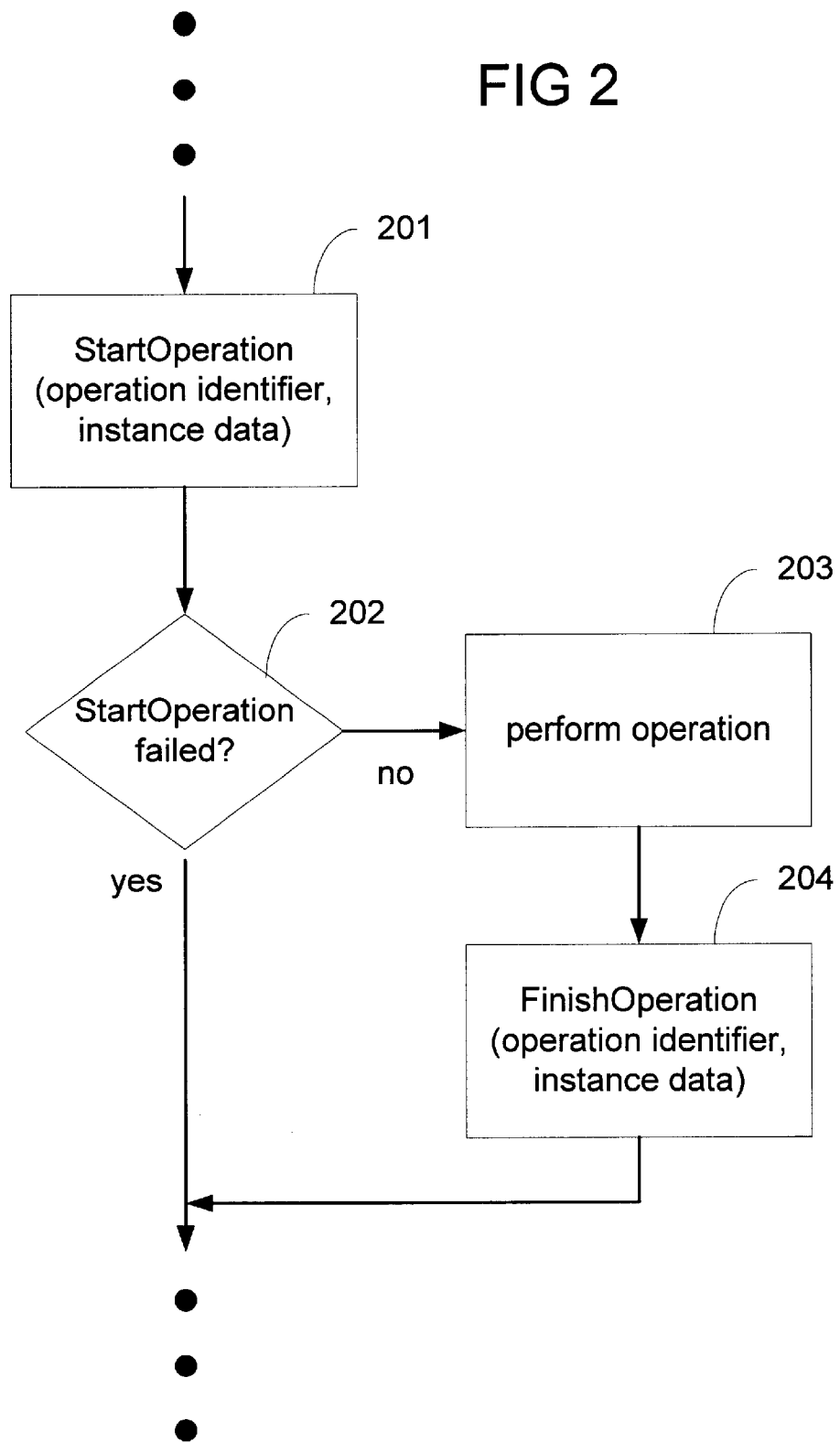
FIG. 2 is a flow diagram showing a program code fragment for invoking a failure-susceptible operation.

FIG. 2 is a flow diagram showing a program code fragment for invoking a failure-susceptible operation. The steps shown in FIG. 2 may be preceded or succeeded by additional steps of the program, such as an operating system, in which it is included. In step 201, the program calls a StartOperation function of the facility. As part of this call, the program passes an operation identifier parameter and an instance data parameter. The operation identifier parameter uniquely identifies the failure-susceptible operation that is to be performed. For example, before attempting a "start device" operation, the program would pass an operation identifier that uniquely identifies start device operations. In a preferred embodiment, a universally unique identifier ("UUID") is used as the operation identifier. Using a UUID as the operation identifier allows programmers that have no way to coordinate their efforts to select operation identifiers that are nonetheless unique. The instance data parameter passed by the program allows the program to identify one of two or more possible different purposes for which the fail-susceptible operation may be invoked. For instance, a start device operation may be invoked on a particular audio card or on a particular modem, each with its own instance data. The steps performed by the facility as part of the StartOperation function are discussed in detail below in conjunction with FIG. 3. Briefly, if the combination of operation identifier and instance data passed to the StartOperation function has failed previously and is on a list of operation instances that is not to be invoked, then the StartOperation function returns failure. Otherwise, the StartOperation function pushes the operation instance on the stack and returns success.

In step 202, if the StartOperation function returns failure, then the program proceeds without performing the failure-susceptible operation, else the program continues in step 203. In step 203, the program performs the failure-susceptible operation. Such performance may either succeed or fail. If performance of the failure-susceptible operation fails, then the program ceases execution in step 203. On the other hand, if the failure-susceptible operation succeeds, execution of the program continues in step 204. In step 204, the facility calls a FinishOperation function of the facility to inform the facility that the operation succeeded. The steps performed by the facility in the FinishOperation function are discussed below in conjunction with FIG. 7. The FinishOperation function takes as its parameters the same operation identifier and instance data as does as the StartOperation function. After step 204, the program continues to perform succeeding steps.

Figure 3:
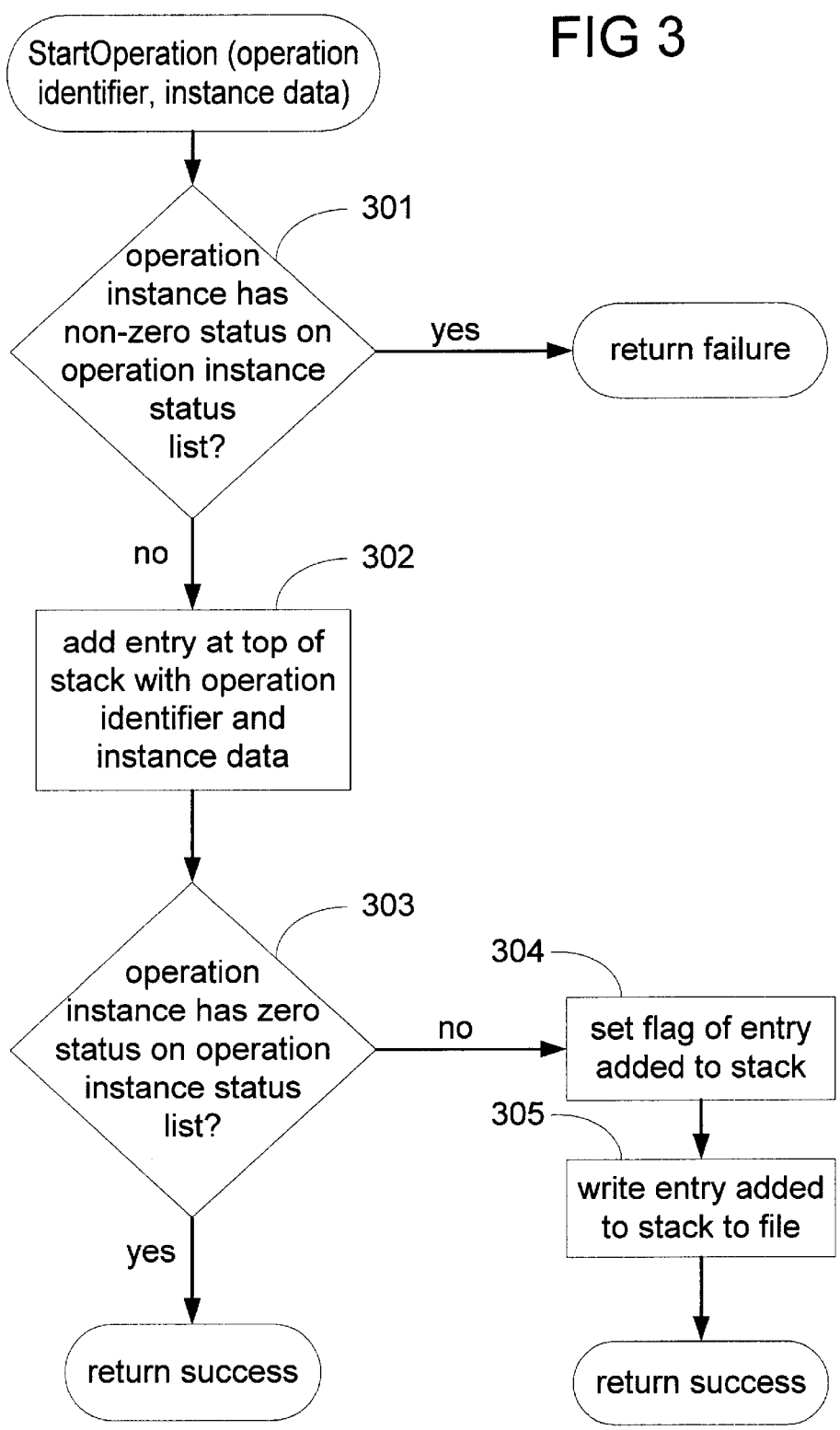
FIG. 3 is a flow diagram showing the steps preferably performed by the facility as part of the StartOperation function that is called before invoking a failure-susceptible operation.

FIG. 3 is a flow diagram showing the steps preferably performed by the facility as part of the StartOperation function that is called before invoking a failure-susceptible operation. The StartOperation function takes as its parameters an operation identifier uniquely identifying the operation to be invoked and instance data identifying one of a number of possible purposes for which the operation may be invoked. These instance data are preferably optional and omitted where the operation in question are always performed for the same purpose. The operation identifier and instance data are said to together make up an operation instance. In step 301, if this operation instance has failed before, then the facility returns failure in order to prevent the calling program from invoking the operation, else the facility continues in step 302. The facility determines whether the operation instance has failed before by consulting an operation instance status list in which the facility maintains the status of operation instances that have been invoked. FIG. 4 is a data structure diagram showing the operation instance status list used by the facility. The operation instance status list 400 is composed of rows such as rows 401 and 402, each containing the operation identifier and instance data of an operation instance that has been invoked. For example, row 401 contains an operation identifier for the start device operation and instance data indicating that the operation instance invokes the start device operation on a "Creative Labs Sound Blaster 16" audio card device. It should be noted that, for the sake of intelligibility, the label "START_DEVICE" is shown in place of the actual UUID for the start device operation that is preferably used by the facility. Each row further contains a status code indicating the status of the operation instance represented by the row. A status of "0," as shown in row 402, indicates that the operation instance has succeeded. A status of "1," as is shown in row 401, indicates that the operation instance has failed. As is discussed below, a status of "2" indicates that the operation instance has failed since the last time that the operating system booting process successfully completed. Operation instances not having a row in the operation instance status list generally have not been invoked and have an undefined status. Where the operation instance identified in the call to the StartOperation function appears in the operation instance status list with a status other than "0", then the facility returns failure, else the facility continues in step 302 to allow the operation instance to be invoked. For example, if the StartOperation function is called with the operation identifier CALL_PCI_BIOS and instance data "read at bus 2 slot 5 function 3 offset 21", where the operation instance status list has the state shown in FIG. 4, the facility continues at step 302.

In step 302, the facility adds an entry to the top of the stack that reflects the state of pending failure-susceptible operations in the computer system. FIG. 5 is a data structure diagram showing sample contents of the stack reflecting the state of failure-susceptible operations in progress in the computer system. The stack 500 comprises of a number of rows, such as rows 501 and 502. Each row identifies a failure-susceptible operation for which the StartOperation function has been called but the FinishOperation function has not. Each row contains the operation identifier and instance data passed to the StartOperation function for the operation instance, as well as a flag called the "write to file" flag, discussed further below. The order of the operation instances on the stack is significant, in that it is generally expected that operation instances will be added to and removed from the stack in a last in-first out manner. Thus, row 502 is at the top of the stack, was added to the stack most recently, and is expected to be removed next FIG. 6 is a data structure diagram showing sample contents of the stack after the addition of a new entry in step 302. It can be seen that row 603 has been added at the top of the stack to identify the operation instance identified in the current call to the StartOperation function.

In step 303, the facility determines whether to set the "write to file" flag for the operation instance. If the current operation instance has a status of "0" in the operation instance status list indicating that the operation instance has succeeded when earlier invoked, then the facility predicts that this operation instance will not fail when invoked this time and returns success without setting the "write to file" flag of the new entry or incurring the cost of writing the new entry persistently to a file. For example, it can be seen that the operation instance having operation identifier CALL_PCI_BIOS and instance data "read at bus 2 slot 5 function 3 offset 21" does not have a row in the operation instance status list shown in FIG. 4 and therefore does not have a status of "0". For this operation instance, therefore, the facility continues to step 304.

If the operation instance does not have a status of "0" indicating that it has succeeded, then the facility continues in step 304 to set the "write to file" flag of the new stack entry. The contents of this entry will be persistently written to a file each time this entry is the highest entry on the stack with its flag set. It can be seen in FIG. 6 that the "write to file" flag in stack entry 603 for the operation instance having operation identifier CALL_PCI_BIOS and instance data "read at bus 2 slot 5 function 3 offset 21" is set to true. In step 305, the facility writes the contents of the new stack entry persistently to the file. If the operation of the program stops while the contents of this entry are written to the file, the facility will later conclude that the failure of the program was the result of the failure of this operation instance and will add it to the list of failed operation instances so that its invocation is prevented in the future. After step 305, the facility returns success.

Figure 7:
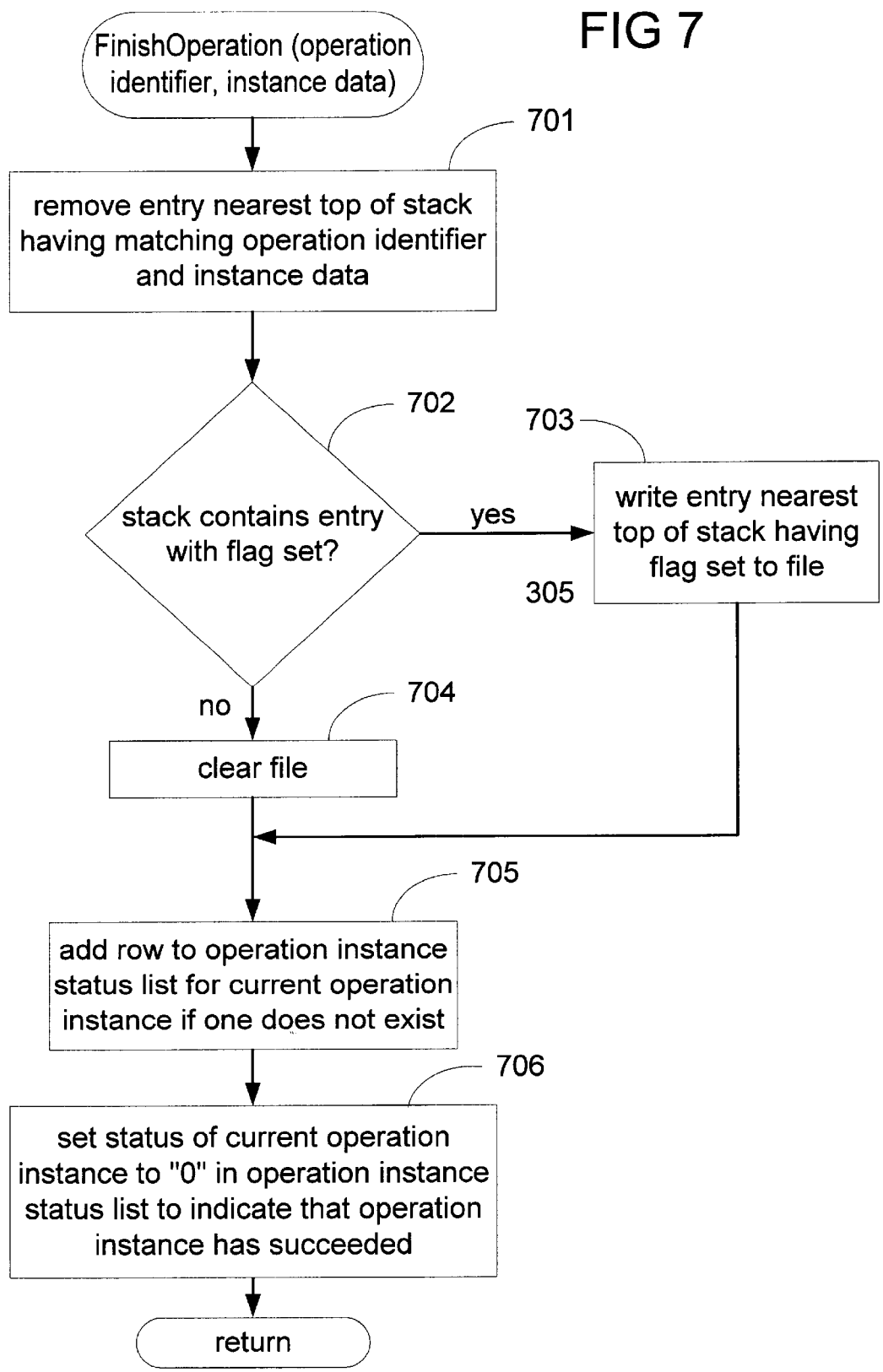
FIG. 7 is a flow diagram showing the steps preferably performed by the facility as part of the FinishOperation function that is called after a failure-susceptible operation has completed.

FIG. 7 is a flow diagram showing the steps preferably performed by the facility as part of the FinishOperation function that is called after a failure-susceptible operation has completed. The FinishOperation function takes as its parameters an operation identifier and instance data identifying the operation instance that has successfully concluded. In step 701, the facility removes from the stack the entry nearest the top of the stack having a matching operation identifier and instance data For example, if the stack is in the state shown in FIG. 6 and the FinishOperation function is called with the operation identifier CALL_PCI_BIOS and instance data "read at bus 2 slot 5 function 3 offset 21," then the facility removes entry 603 from the stack in step 701, thus changing the state of the stack back to that shown in FIG. 5.

In step 702, if the new state of the stack contains an entry whose "write to file" flag is set, then the facility continues in step 703, else the facility continues in step 704. In step 703, the facility writes the entry nearest the top of the stack having its "write to file" flag set persistently to the file. After step 703, the facility continues in step 705. If the execution of the program ceases while the file contains this operation instance, the facility will determine that the failure of the program resulted from the failure of this operation instance. In step 704, if the stack does not contain any entries having a set "write to file" flag, then the facility clears the file so that it does not contain any operation instances. In step 705, the facility adds the operation instance to the operation instance status list if the operation instance status list does not already contain it. For example, if the state of the list of operation instances that have succeeded is as shown in FIG. 6, a row is added to the operation instance status list for the current operation instance as shown in FIG. 8. FIG. 8 is a data structure diagram showing the contents of the operation instance status list after an operation instance has completed successfully. It can be seen that row 803 has been added to the list 800. In step 706, the facility sets the status of the current operation instance to "0" in the operation instance status list to indicate that the operation instance has succeeded. It can be seen that new row 803 added to the operation instance status list contains the status of "0" for the current operation instance. When the StartOperation function is called for this operation instance in the future, its "write to file" flag will not be set, so that the cost of writing its stack entry persistently to the file is not incurred. After step 706, the FinishOperation function returns.

Figure 9:
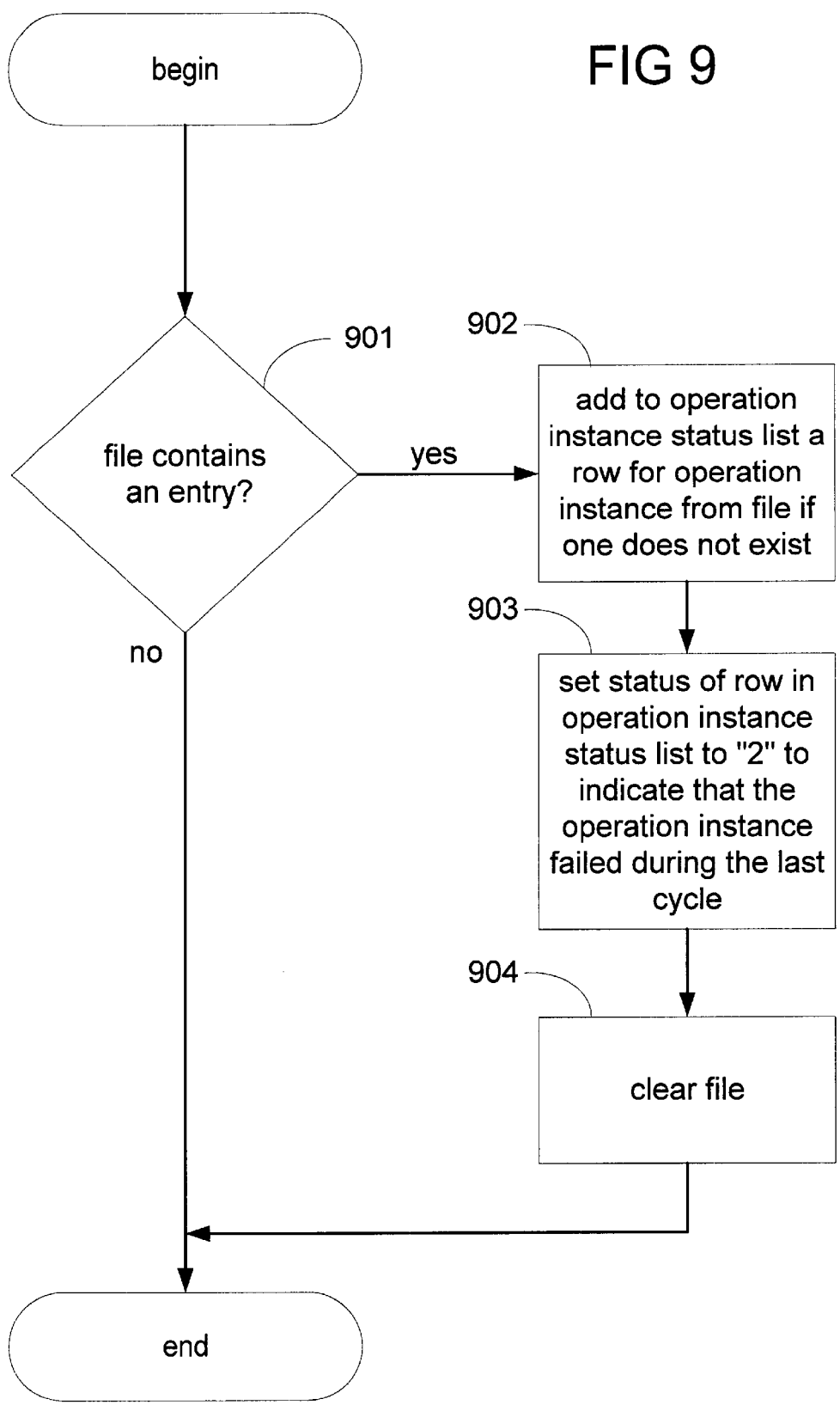
FIG. 9 is a flow diagram showing the steps preferably performed by the facility at the beginning of the execution of the program to determine whether the last execution of the program terminated abnormally.

As discussed above, at the beginning of the execution of the program, such as the beginning of the booting process of an operating system, the facility determines whether the program terminated abnormally during its last execution. FIG. 9 is a flow diagram showing the steps preferably performed by the facility at the beginning of the execution of the program to determine whether the last execution of the program terminated abnormally. These steps are preferably performed as early as possible in the execution of the program, such as at the beginning of the booting process. In step 901, if the file contains the information from a stack entry identifying an operation instance, the facility continues in step 902, else the steps conclude. In step 902, the facility adds a row to the operation instance status list identifying the operation instance stored in the file if it does not already contain such a row. FIG. 10 is a data structure diagram showing the operation instance status list after the addition of an operation instance contained by the file. It can be seen by comparing FIG. 10 to FIG. 8 that row 1004, which identifies the operation instance identified in the file, has been added to the operation instance status list 1000. In step 903, the facility sets the status of the operation instance from the file to "2" in the operation instance status list to indicate that the operation instance failed since the last time that the program startup process was successfully completed. It can be seen in FIG. 10 that the facility has accordingly set the status of new row 1004 to "2." In step 904, the facility clears the file, and these steps conclude. At the conclusion of the steps shown in FIG. 9, the program continues its startup operations and may call the StartOperation function to attempt additional failure-susceptible operations. If the program again attempts to call the StartOperation function for the operation instance from the file, the StartOperation function will not permit the program to attempt this operation instance.

Figure 11:
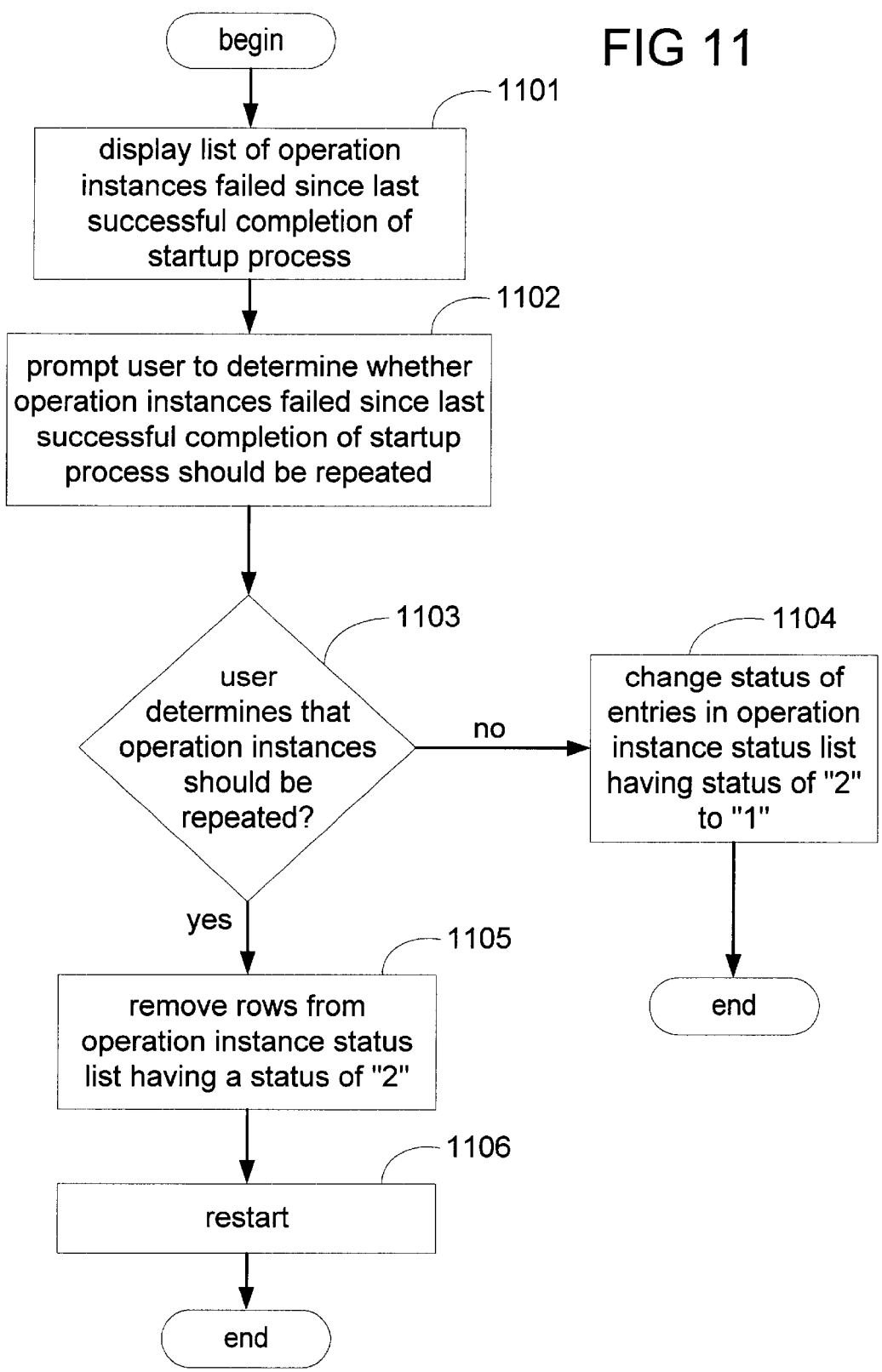
FIG. 11 is a flow diagram showing the steps preferably performed by the facility at the conclusion of the program startup process.
Figure 12:
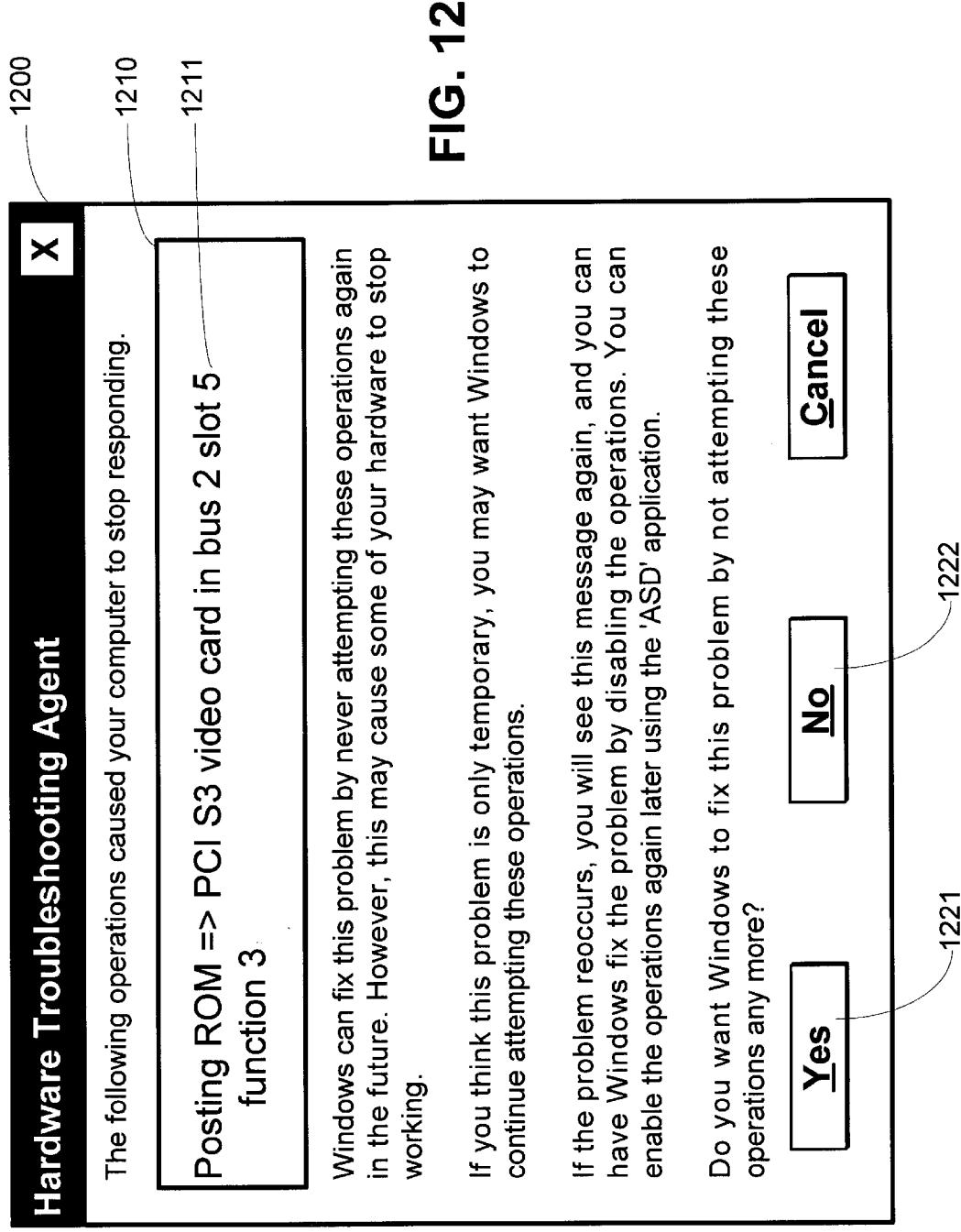
FIG. 12 is a display diagram showing the window preferably displayed by the facility to display a list of operation instances failed since the last time that the program startup process was successfully completed.

FIG. 11 is a flow diagram showing the steps preferably performed by the facility at the conclusion of the program startup process. These steps process the contents of the list of operation instances failed since the last time that the program startup process was successfully completed. In step 1101, the facility displays to the user a list of operation instances failed since the last time that the program startup process was successfully completed. Step 1101 preferably involves displaying a textual description of each operation instance having a status of "2" in the operation instance status list, such as 1004 shown in FIG. 10. These operation instances include, at most, one successful operation instance for each failure of the program startup process since the last completion of the program startup process. FIG. 12 is a display diagram showing the window preferably displayed by the facility to display a list of operation instances failed since the last time that the program startup process was successfully completed. The window 1200 includes a list 1210 of operation instances failed since the last time that the program startup process was successfully completed. This list includes textual descriptions of these. operation instances, such as textual description 1211. The textual descriptions shown in list 1210 are preferably stored for each operation or operation instance in an operation information list. FIG. 13 is a data structure diagram showing an operation information list that contains a textual description of each operation. The operation information list 1300 contains rows, such as rows 1301–1303, that each contain an operation identifier, a textual description for the operation identifier, and, optionally, a reference to a custom routine for displaying information about and/or remediating failures of the operation. In a further preferred embodiment, the rows of the operation information list 1300 are further differentiated by the possible instance data values for each operation (not shown).

Figure 14:
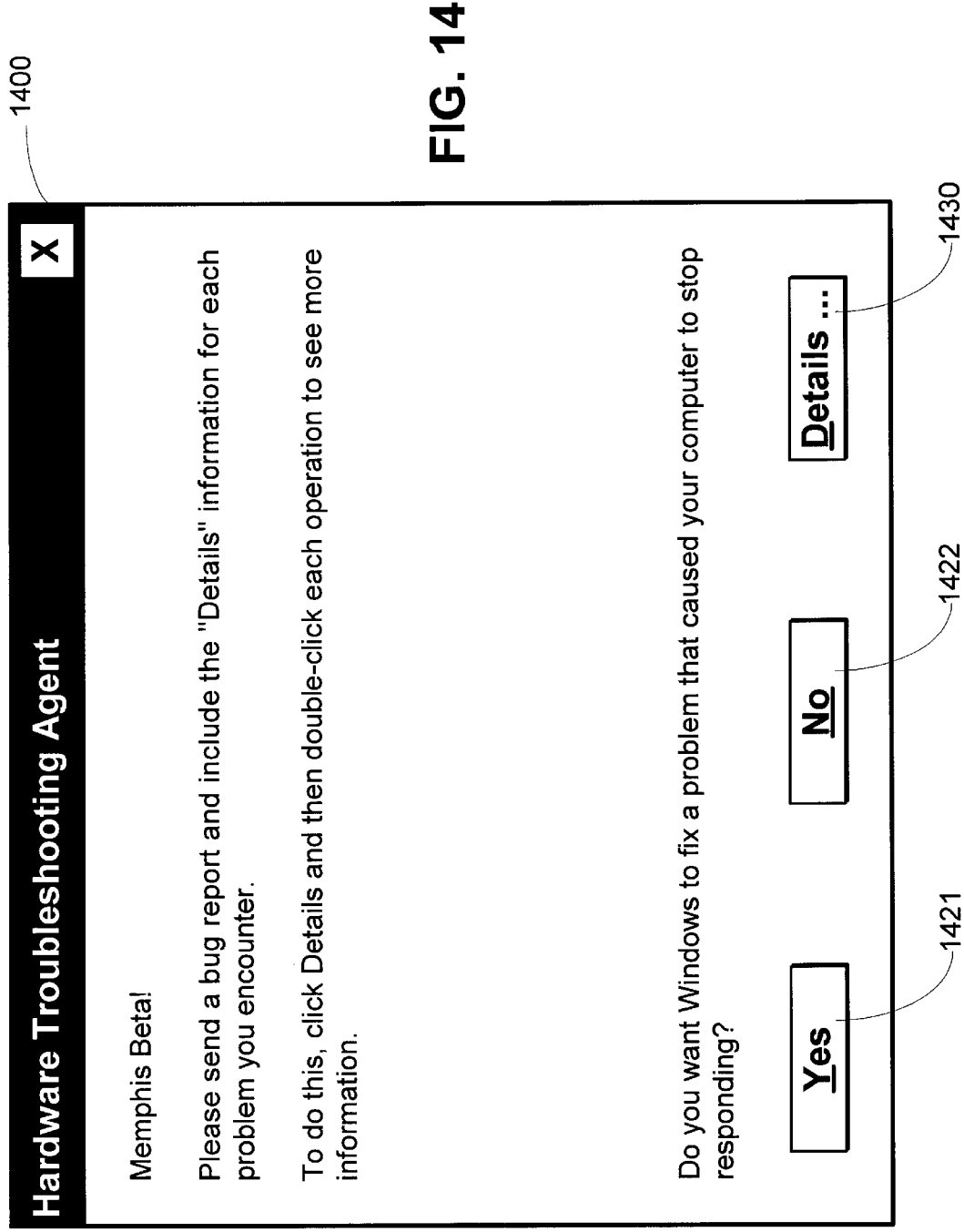
FIG. 14 is a display diagram showing a window displayed in one embodiment of the facility that prompts the user to determine whether operation instances failed since the last time that the program startup process was successfully completed should be repeated without listing such operations.

In step 1102, the facility prompts the user to determine whether the operations failed since the last time that the program startup process was successfully completed should be repeated or prohibited. In response to step 1102, the user may press button 1221 in order to prohibit these operations or press button 1222 to repeat these operations. As an alternative to user interface steps 1101 and 1102, the facility may initially display a window that prompts the user to determine whether operations failed since the last time that the program startup process was successfully completed should be repeated without displaying a list of such operations. FIG. 14 is a display diagram showing a window displayed in one embodiment of the facility that prompts the user to decide whether operation instances failed since the last time that the program startup process was successfully completed should be repeated without listing such operations. The window 1400 contains a button 1421 that the user may select to prohibit operations failed since the last time that the program startup process was successfully completed. The user may instead press button 1422 to repeat operations failed since the last time that the program startup process was successfully completed. The user may also press button 1430 in order to display window 1200 shown in FIG. 12, which lists the operations failed since the last time that the program startup process was successfully completed.

In step 1103, if the user selects button 1222 or 1422 to repeat the failed operation, then the facility continues at step 1105, else the facility continues in step 1104. In step 1104, the facility changes the status of operation instances in the operation instance status list having a status of "2," indicating that the operation instance failed since the last time that the program startup process was successfully completed, to a status of "1," indicating that the operation instances have failed. As a result, the facility will prohibit the invocation of these operation instances in the future. FIG. 15 is a data structure diagram showing the change, in the operation instance status list, of the status of operation instances that failed since the last time that the program startup process was successfully completed to "1" indicating that they have failed. It can be seen by comparing FIG. 15 to FIG. 10 that the status in row 1004 in FIG. 10 for the post ROM operation instance that failed since the last time that the program startup process was successfully completed has been changed to a "1" in row 1504 in FIG. 15. With a status of "1," the StartOperation function will not permit this operation instance to be invoked in the future. After step 1104, these steps conclude.

In step 1105, as the user has determined that the operation instances failed since the last time that the program startup process was successfully completed should be repeated, the facility removes any entries in the operation instance status list having a status of "2." FIG. 16 is a data structure diagram showing the removal from the operation instance status list of operation instances that failed since the last time that the program startup process was successfully completed. It can be seen by comparing FIG. 16 to FIG. 10 that the facility has removed row 1004 in FIG. 10 from the operation instance status list shown in FIG. 16. As a result, the StartOperation function will permit this operation instance to be invoked again in the future. In step 1106, the facility restarts the program in order to repeat the operation instances that failed since the last time that the program startup process was successfully completed. In one preferred embodiment, step 1106 is omitted so that the operation instances failed since the last time that the program startup process was successfully completed are not repeated until the next time that the program is restarted for another purpose. After step 1106, these steps conclude.

Figure 17:
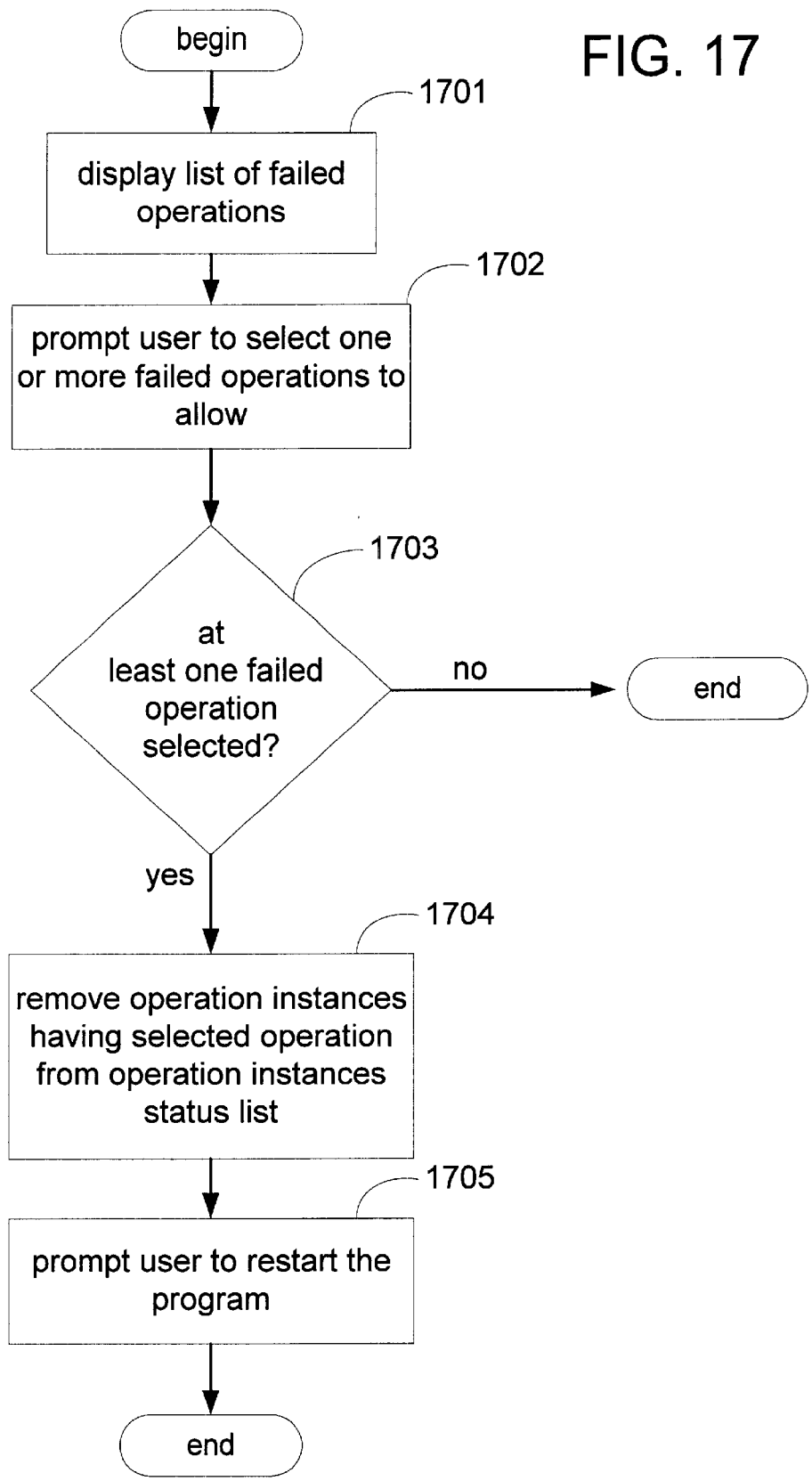
FIG. 17 is a flow diagram showing steps of the facility preferably invocable by the user to display and modify the contents of the list of prohibited operation instances.

FIG. 17 is a flow diagram showing steps of the facility preferably invocable by the user to display and modify the contents of the list of prohibited operation instances. In step 1701, the facility displays a list of failed operation instances by looking up their textual descriptions in the operation information list for operation instances in the operation instance status list having a status of "1" and appending the instance data of these operation instances. In step 1702, the facility prompts the user to select one or more of the failed operations to permit to be invoked in the future. In step 1703, if the user selected at least one failed operation in step 1702, then the facility continues in step 1704, else these steps conclude. In step 1704, the facility removes from the operation instance status list any operation instances selected by the user. As a result, the StartOperation function will again allow the selected operation instances to be invoked. In step 1705, the facility displays a prompt to restart the program. Where the program is an operating system, this causes the operating system to be rebooted. After step 1705, these steps conclude.

Figure 18:
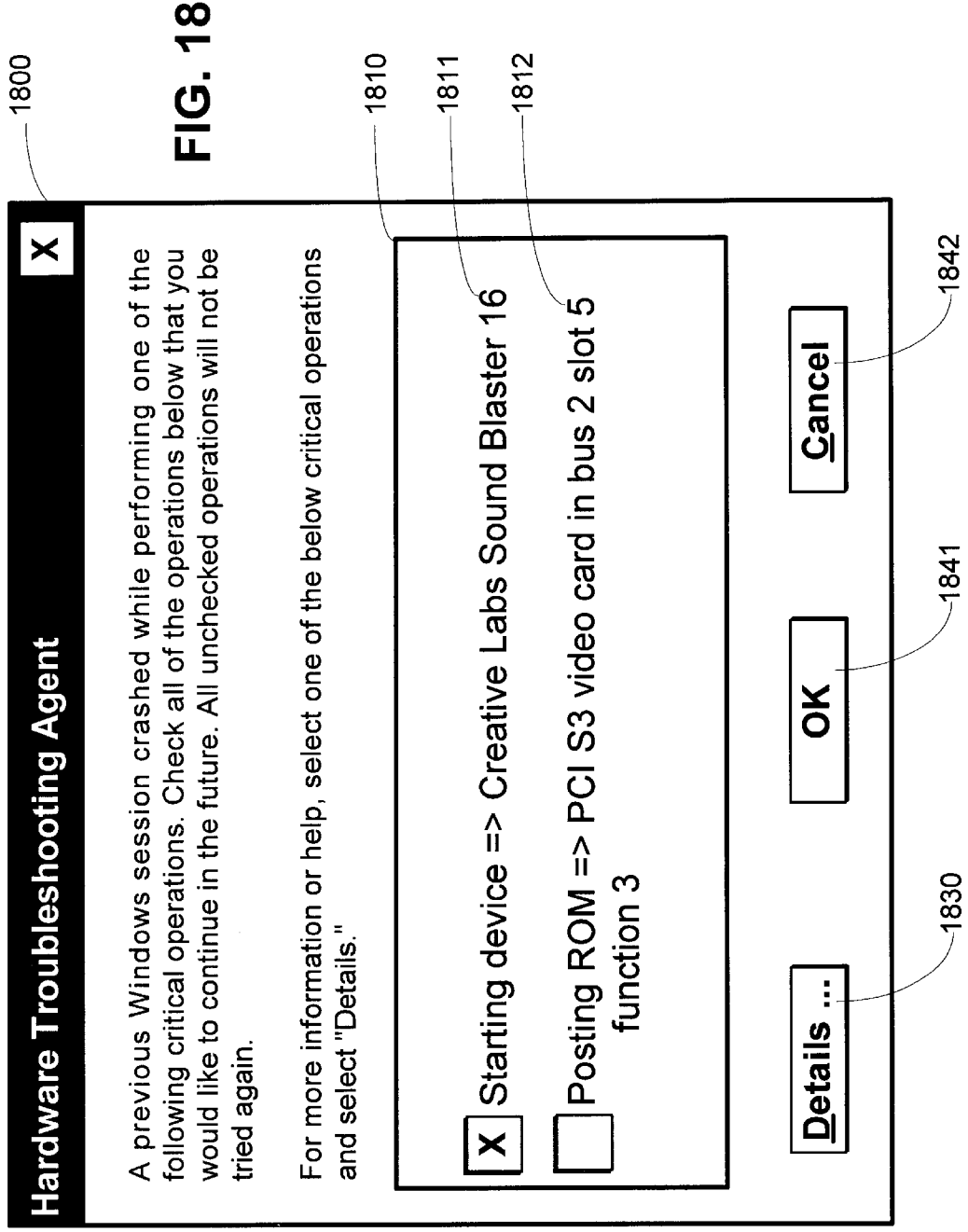
FIG. 18 is a display diagram showing the window displayed by the facility in order to display and allow the user to adjust the list of prohibited operation instances.

FIG. 18 is a display diagram showing the window displayed by the facility in order to display and allow the user to adjust the list of prohibited operation instances. The window 1800 contains a list of prohibited operation instances 1810. The list contains textual descriptions of the operations on the prohibited list of operation instances, such as textual descriptions 1811 and 1812. The user may select any of the textual descriptions of prohibited operation instances, then press button 1841 in order to remove the selected operations from the operation instance status list. Once removed, these operation instances will again be permitted by the StartOperation function. The user may also press button 1842 in order to leave the list of prohibited operation instances intact. FIG. 19 is a data structure diagram showing the contents of the operation instance status list after an operation instance has been removed by the user. It can be seen by comparing FIG. 19 to FIG. 15 that, in accordance with the user's selection of the textual description 1811 for the starting device operation instance, the facility has deleted row 1501 for the starting device operation instance shown in FIG. 15 from the operation instance status list shown in FIG. 19. As a result, the StartOperation function will permit this start device operation instance to be invoked again in the future.

Figure 20:
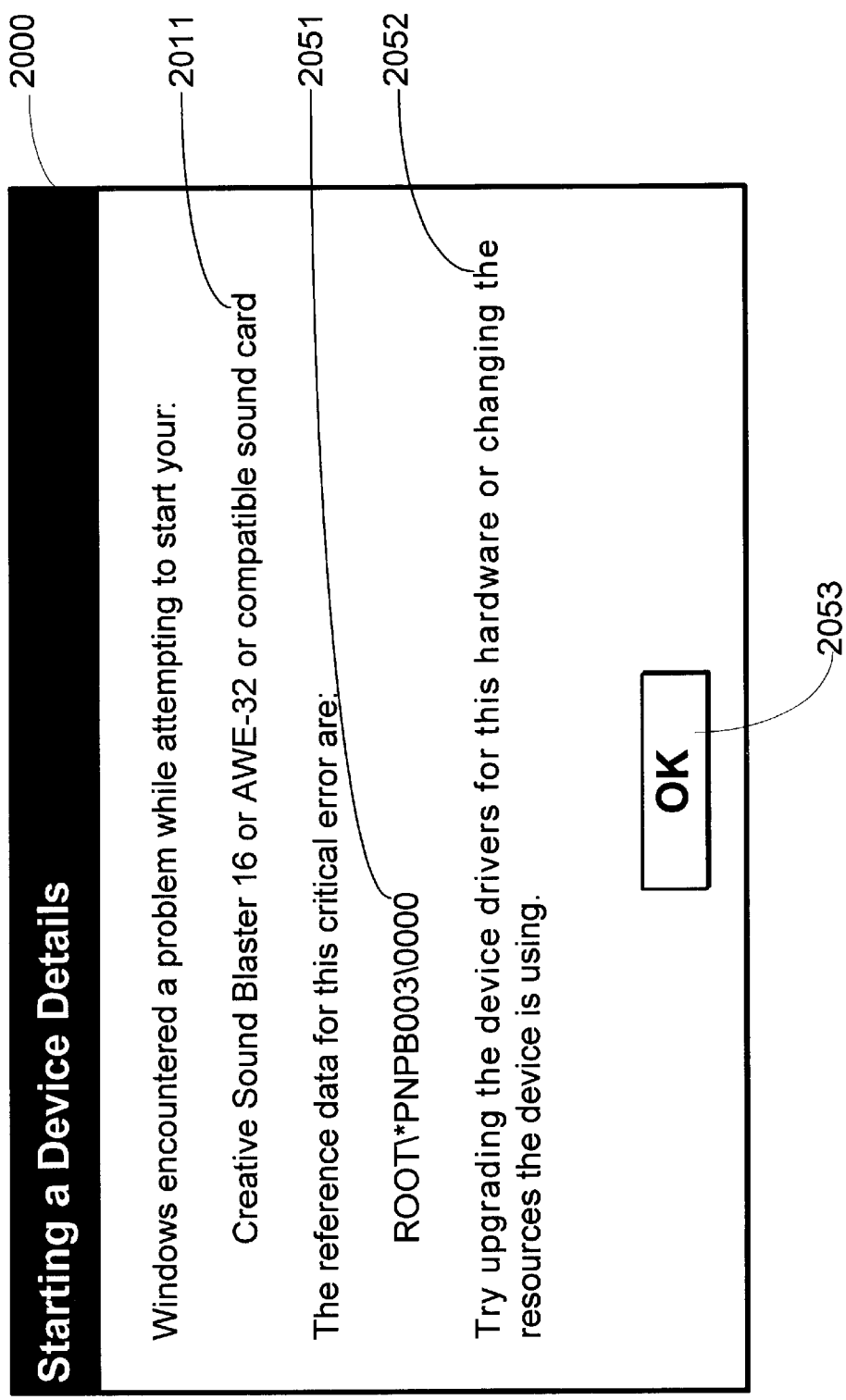
FIG. 20 is a display diagram showing a window displayed by the facility in order to display the details of a selected prohibited operation instance.

When presented with window 1800, the user may further select one of the textual descriptions and press button 1830 in order to display details about the operation. FIG. 20 is a display diagram showing a window displayed by the facility in order to display the details of a selected prohibited operation instance. Such a window may generally be displayed for any operation on the failed operations list. The window 2000 contains the textual description of the operation 2011, reference data 2051 for the operation instance, and a suggestion 2052 for remediating the failure of this operation instance. The user may press button 2053 to return to window 1800 shown in FIG. 18. The facility may preferably be customized to display additional information about certain operations or take automated steps to remediate the failure of the operation or operation instance using a custom routine referenced in the operation information list 1300 shown in FIG. 13 for the operation or operation instance in question.

To facilitate the description of the invention, the operation of the facility has been described with respect to a simple operation instance status list. While the facility may indeed be implemented using such a list, one embodiment of the invention stores the information contained in the operation status list in a single central data structure for the computer system called the registry. The registry permits one or more values to be stored for each of a large number of keys. When used in conjunction with the registry, the facility preferably creates its own keys for each operation instance for which the StartOperation function is called. For the key created for a particular operation instance, the facility stores a value of "0" if the operation instance succeeded, a value of "1" if the operation instance failed, and a value of "2" if the operation instance failed since the last time that the program startup process was successfully completed. Other information stored by the facility, such as the information stored in the operation information list, may likewise be stored in the registry.

While this invention has been shown and described with reference to preferred embodiments, it will be understood by those skilled in the art that various changes or modifications in form and detail may be made without departing from the scope of the invention. For example, while the facility was originally designed to manage the invocation of failure-susceptible operations during the booting process of an operating system, those skilled in the art will recognize that it may be straightforwardly adapted to error-susceptible operations performed by any computer program. Further, the data described herein as being stored in lists and stacks may instead be maintained in various other forms.

We claim:

1. A method in a computer system for displaying a list of operations whose invocation is prohibited in the computer system, the method comprising:

retrieving a list of operations that have failed in the computer system and whose invocation has therefore been automatically prohibited;

displaying the retrieved list of operations;

receiving user input selecting at least one of the displayed operations; and in response to the received user input, removing the selected at least one operation from the list of failed operations to permit the future invocation of the selected at least one operation.

2. The method of claim 1 wherein the display of the retrieved list of operations includes a textual description of an operation.

3. The method of claim 1 wherein the display of the retrieved list of operations includes data about the particular failure instance of an operation.

4. The method of claim 1 wherein the display of the retrieved list of operations includes a reference to a routine for displaying information about the failure of an operation.

5. The method of claim 1 wherein the display of the retrieved list of operations includes a reference to a routine for remediating the failure of an operation.

6. A computer-readable medium having computer-executable instructions for performing a method in a computer system for displaying a list of operations whose invocation is prohibited in the computer system, the method comprising:

retrieving a list of operations that have failed in the computer system and whose invocation has therefore been automatically prohibited;

displaying the retrieved list of operations;

receiving user input selecting at least one of the displayed operations; and in response to the received user input, removing the selected at least one operation from the list of failed operations to permit the future invocation of the selected at least one operation.

7. A display device of a computer system having rendered thereon a list of operations that have failed in the computer system and whose invocation has therefore been automatically prohibited, the display device further having rendered thereon an area selectable by a user of the computer system to indicate that an operation in the list of failed operations should be removed from the list of failed operations to permit the future invocation of the operation.

* * * * *

UNITED STATES PATENT AND TRADEMARK OFFICE
CERTIFICATE OF CORRECTION

PATENT NO. : 6,430,706 B1  Page 1 of 1
DATED : August 6, 2002
INVENTOR(S) : Santerre et al.

It is certified that error appears in the above-identified patent and that said Letters Patent is hereby corrected as shown below:

Column 1,
Line 40, "tot" should read -- to --.

Column 3,
Line 49, "inventions an" should read -- invention, an --.

Column 6,
Line 54, "next FIG.6" should read -- next. FIG.6 --.

Column 7,
Line 33, "data For" should read -- data. For --.

Column 8,
Line 59, "these. operation" should read -- these operation --.

Signed and Sealed this

Thirteenth Day of April, 2004

JON W. DUDAS
*Acting Director of the United States Patent and Trademark Office*